(12) United States Patent
Sato et al.

(10) Patent No.: US 7,381,757 B2
(45) Date of Patent: Jun. 3, 2008

(54) DECOLORABLE INK, IMAGE FORMING METHOD AND IMAGE FORMING APPARATUS

(75) Inventors: Koichi Sato, Kanagawa (JP); Ikuo Nakazawa, Kanagawa (JP); Sakae Suda, Kanagawa (JP); Masayuki Ikegami, Kanagawa (JP)

(73) Assignee: Canon Kabushiki Kaisha, Shimomaruko Ohta-ku, Tokyo (JP)

( * ) Notice: Subject to any disclaimer, the term of this patent is extended or adjusted under 35 U.S.C. 154(b) by 330 days.

(21) Appl. No.: 10/457,193

(22) Filed: Jun. 9, 2003

(65) Prior Publication Data

US 2003/0232903 A1    Dec. 18, 2003

(30) Foreign Application Priority Data

Jun. 14, 2002 (JP) ............................. 2002-174356

(51) Int. Cl.
   *C09D 11/00* (2006.01)
(52) U.S. Cl. ....................................... 523/160; 523/161
(58) Field of Classification Search ................ 523/160, 523/161
   See application file for complete search history.

(56) References Cited

U.S. PATENT DOCUMENTS

| | | | |
|---|---|---|---|
| 3,062,892 A | 11/1962 | Schneider | |
| 4,313,124 A | 1/1982 | Hara | |
| 4,345,262 A | 8/1982 | Shirato et al. | |
| 4,459,600 A | 7/1984 | Sato et al. | |
| 4,463,359 A | 7/1984 | Ayata et al. | |
| 4,558,333 A | 12/1985 | Sugitani et al. | |
| 4,723,129 A | 2/1988 | Endo et al. | |
| 4,740,796 A | 4/1988 | Endo et al. | |
| 5,139,574 A * | 8/1992 | Winnik et al. | 524/84 |
| 5,145,518 A * | 9/1992 | Winnik et al. | 523/161 |
| 6,313,066 B1 * | 11/2001 | Takayama | 503/201 |
| 6,375,742 B2 * | 4/2002 | Sano et al. | 118/600 |
| 6,380,315 B1 * | 4/2002 | Fischer et al. | 525/256 |
| 6,875,798 B2 * | 4/2005 | Yui et al. | 523/160 |
| 2003/0153649 A1 * | 8/2003 | Bromberg | 523/160 |
| 2005/0272834 A1 * | 12/2005 | Ikegami et al. | 523/160 |

FOREIGN PATENT DOCUMENTS

| | | |
|---|---|---|
| EP | 1285948 A2 * | 2/2003 |
| JP | 59-123670 | 7/1984 |
| JP | 59-138461 | 8/1984 |
| JP | 11-080221 | 3/1999 |
| JP | 11-322866 | 11/1999 |
| JP | 11-322942 | 11/1999 |

OTHER PUBLICATIONS

"Marking Material Supporting High Speed and High Resolution," The Imaginig Society of Japan, 50th Technical Seminar Text, pp. 50-59, Dec. 4, 2000.

* cited by examiner

*Primary Examiner*—Edward J. Cain
(74) *Attorney, Agent, or Firm*—Morgan & Finnegan, L.L.P.

(57) ABSTRACT

A decolorable ink usable in various printing processes and an image forming method utilizing such decolorable ink. The decolorable ink comprises a block polymer having a stimulus responsiveness, a colorant which decolors in response to a change in a property of the block polymer when a stimulus is applied to the block polymer, and a solvent. Also the image forming method conducts recording by applying ink onto a recording medium, utilizing the decolorable ink as the ink.

4 Claims, 1 Drawing Sheet

FIGURE
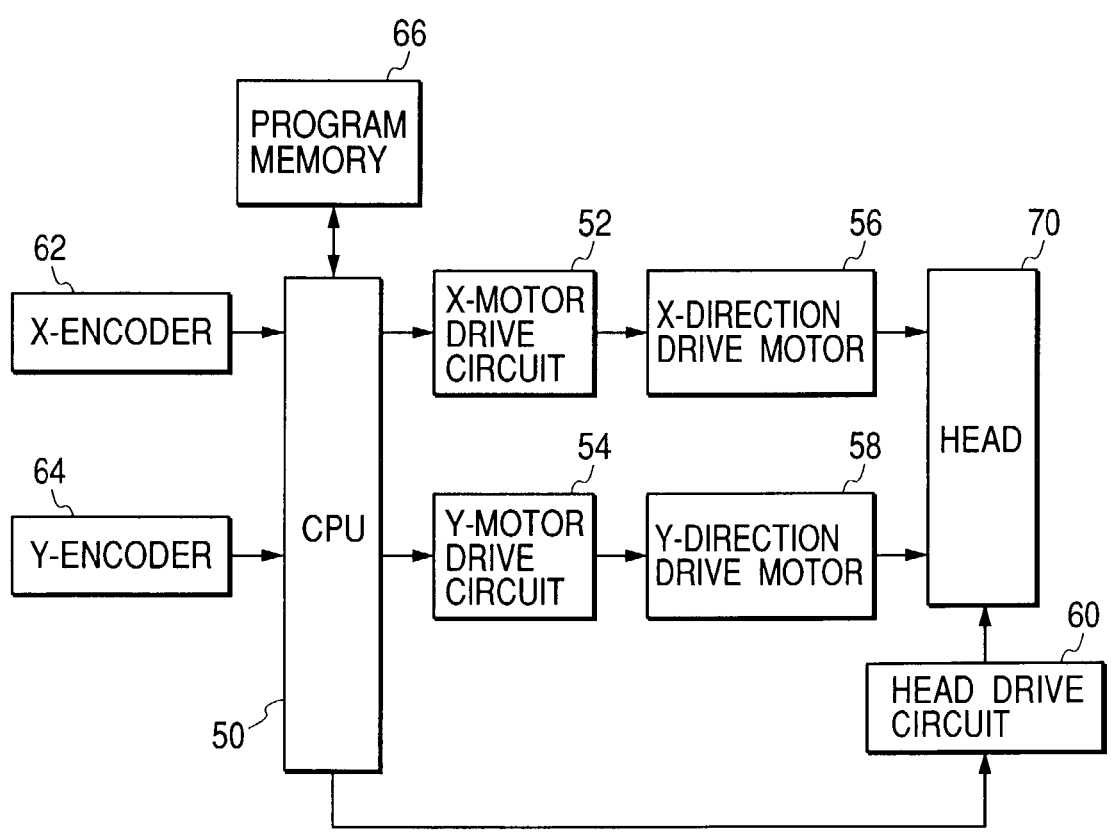

DECOLORABLE INK, IMAGE FORMING METHOD AND IMAGE FORMING APPARATUS

BACKGROUND OF THE INVENTION

1. Field of the Invention

The present invention relates to a decolorable ink which can be utilized in various printing processes. More particularly, the present invention relates to an image forming method, an image forming apparatus, an image erasing method and an image erasing apparatus utilizing a decolorable ink.

2. Related Background Art

Digital printing technologies are recently showing a remarkable progress. Such digital printing technologies are represented by an electrophotographic technology and an ink jet technology, and are expanding their pervasiveness as image forming technologies in offices and homes. On the other hand, with the spreading of such printing technologies in the offices and the homes, discharged paper wastes are increasing significantly. Such paper wastes are often difficult to recycle in a simple manner since there are involved many confidential documents, and an increase in the consumption of the resources is being concerned. Under such situation, technologies such as a decolorable toner and a decolorable ink are being investigated for reusing paper (The Imaging Society of Japan, 50th Technical Seminar Text, p.50) but still many improvements are being required.

SUMMARY OF THE INVENTION

An object of the present invention is to provide a satisfactory decolorable ink employable in various printing processes. In particular, a further object of the present invention is to provide an image forming method, an image forming apparatus, an image erasing method and an image erasing apparatus utilizing a decolorable ink.

As a result of intensive investigations, the present inventors have made the present invention.

More specifically, a first aspect of the present invention provides a decolorable ink comprising a block polymer having a stimulus responsiveness, a colorant which decolors in response to a change in the property of the block polymer when a stimulus is applied thereto, and a solvent.

The above-mentioned colorant is preferably in a solid granular state.

Also the stimulus responsiveness is preferably a heat responsiveness or a solvent responsiveness.

Also the colorant is preferably formed by a leuco dye.

Also the block polymer includes polyvinyl ether as a repeating unit structure.

Also the repeating unit structure of polyvinyl ether preferably has a structure represented by the following general formula (1):

(1)

wherein $R^1$ represents a linear, branched or cyclic alkyl group with 1 to 18 carbon atoms, Ph, Pyr, Ph-Ph, Ph-Pyr, $-(CH(R^2)-CH(R^3)-O)_1-R^4$ or $-(CH_2)_m-(O)_n-R^4$, in which a hydrogen atom in an aromatic ring may be substituted by a linear or branched alkyl group with 1 to 4 carbon atoms while a carbon atom in an aromatic ring may be substituted by a nitrogen atom; l is an integer from 1 to 18; m is an integer from 1 to 36; n represents 0 or 1; $R^2$ and $R^3$ each independently represents a hydrogen atom or $CH_3$; and $R^4$ represents a hydrogen atom, a linear, branched or cyclic alkyl group with 1 to 18 carbon atoms, Ph, Pyr, Ph-Ph, Ph-Pyr, $-CHO$, $-CO-CH=CH_2$, or $-CO-C(CH_3)=CH_2$, in which, in case $R^4$ is other than a hydrogen atom, a hydrogen atom in an aromatic ring may be substituted by a linear or branched alkyl group with 1 to 4 carbon atoms, F, Cl or Br while a carbon atom in an aromatic ring may be substituted by a nitrogen atom.

The above-mentioned ink is preferably an ink for ink jet recording.

A second aspect of the present invention provides an image forming method comprising applying an ink onto a recording medium to conduct recording, in which the ink is a decolorable ink comprising a block polymer having a stimulus responsiveness, a colorant which decolors in response to a change in the property of the block polymer when a stimulus is applied thereto, and a solvent.

It is preferred to eject the ink by applying a thermal energy to the ink.

A third aspect of the present invention provides an image forming apparatus to be employed in the aforementioned image forming method.

A fourth aspect of the present invention provides a method for erasing an image recorded with a decolorable ink on a recording medium wherein the decolorable ink comprises a block polymer having a stimulus responsiveness, a colorant which decolors in response to a change in the property of the block polymer when a stimulus is applied thereto, and a solvent, the method comprising a step of giving a stimulus to the block polymer to decolor the colorant, so that the image is erased by such decoloring process.

A fifth aspect of the present invention provides an image erasing apparatus to be employed in the aforementioned image erasing method.

BRIEF DESCRIPTION OF THE DRAWINGS

FIGURE is a block diagram showing a configuration of an ink jet recording apparatus.

DESCRIPTION OF THE PREFERRED EMBODIMENTS

A first aspect of the present invention provides a decolorable ink comprising a block polymer having a stimulus responsiveness, a colorant which decolors in response to a change in the property of the block polymer when a stimulus is applied thereto, and a solvent. In a representative manner, the ink of the present invention can be used in the following manner. Applying the ink of the present invention onto a recording medium forms a colored image. When giving a certain stimulus to the recording medium, the block polymer contained in the decolorable ink of the present invention responds to such stimulus, whereby the decolorable colorant decolors for example by a contact with a decoloring substance. As a result, the recording medium returns to a reusable state. The present invention is featured by the use of a block polymer having a stimulus responsiveness. A block polymer can easily form a polymer micelle structure, in which a solid particulate substance such, as a pigment can be included. In the present invention, it is preferred that a decolorable colorant is included or adsorbed. Also the solvent can be water or an organic solvent, but water is preferably employed because of environmental consideration.

The block polymer having the stimulus responsiveness, advantageously employable in the present invention, preferably has a repeating unit structure of polyvinyl ether. More specifically, the repeating unit structure of polyvinyl ether preferably is a structure represented by the following general formula (1):

(1)

wherein $R^1$ represents a linear, branched or cyclic alkyl group with 1 to 18 carbon atoms, Ph, Pyr, Ph-Ph, Ph-Pyr, $-(CH(R^2)-CH(R^3)-O)_l-R^4$ or $-(CH_2)_m-(O)_n-R^4$, in which a hydrogen atom in an aromatic ring may be substituted by a linear or branched alkyl group with 1 to 4 carbon atoms while a carbon atom in an aromatic ring may be substituted by a nitrogen atom; l is an integer from 1 to 18; m is an integer from 1 to 36; n represents 0 or 1; $R^2$ and $R^3$ each independently represents a hydrogen atom or $CH_3$; and $R^4$ represents a hydrogen atom, a linear, branched or cyclic alkyl group with 1 to 18 carbon atoms, Ph, Pyr, Ph-Ph, Ph-Pyr, —CHO, —CO—CH=$CH_2$, or —CO—C($CH_3$)=$CH_2$, in which, in case $R^4$ is other than a hydrogen atom, a hydrogen atom in an aromatic ring may be substituted by a linear or branched alkyl group with 1 to 4 carbon atoms, F, Cl or Br while a carbon atom in an aromatic ring may be substituted by a nitrogen atom.

In the foregoing, -Ph represents a phenyl group; -Pry represents a pyridyl group; -Ph-Ph represents a biphenyl group; and -Ph-Pyr represents a pyridylphenyl group, wherein the pyridyl group, biphenyl group or pyridylphenyl group may be an isomer of any position.

A main chain structure of polyvinyl ether, being very flexible, shows a satisfactory responsiveness to a stimulus. Specific examples of the block polymer, having a repeating unit structure of stimulus responsive polyvinyl ether, are shown in the following.

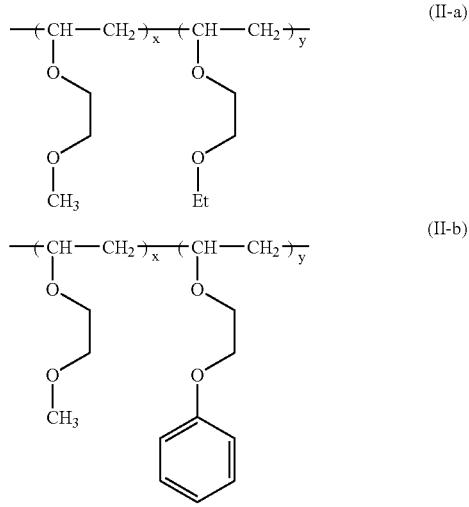

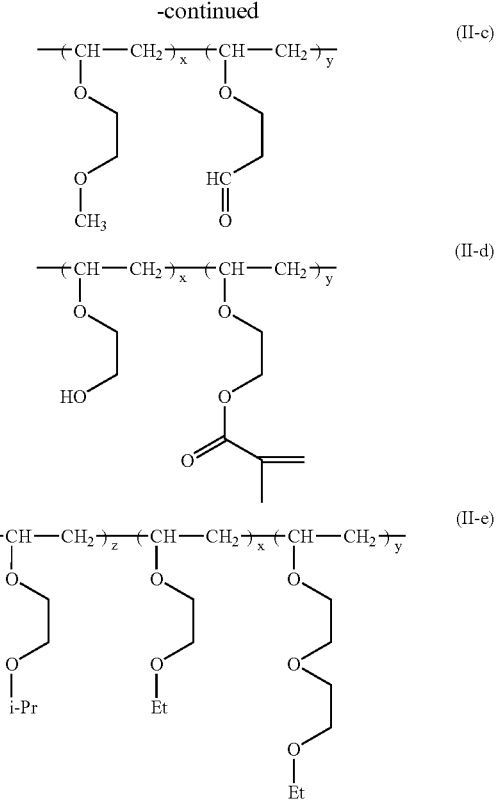

However, for the aforementioned block polymer having the polyvinyl ether main chain structure, 100% of the polymer chain is not required to be constituted by polyvinyl ether, but the block polymer may contain polyvinyl ether in an amount of 10 mol. % or higher. The soft polymer characteristics may be insufficient at a content less than 10 mol. %. Various methods have been reported for synthesizing a polymer having a polyvinyl ether structure (Japanese Patent Application Laid-Open No. 11-080221), a method utilizing a cationic living polymerization reported by Aoshima et al. is representative (Japanese Patent Applications Laid-Open Nos. 11-322942 and 11-322866). A polymer synthesis by cationic living polymerization allows to synthesize various polymers such as a homopolymer, a copolymer constituted by two or more monomers, a block polymer, a graft polymer or graduation polymer, with an exactly aligned length (molecular weight). Also in the polyvinyl ether, various functional groups can be introduced in a side chain thereof. The cationic polymerization may also be executed in a $HI/I_2$ system or a $HCl/SnCl_4$ system.

The block polymer employed in the present invention preferably has a number-average molecular weight within a range from 100 to 10,000,000, more preferably from 1,000 to 1,000,000. A molecular weight less than 100 may not provide a steric effect of the polymer, while a molecular weight higher than 10,000,000 may result in an excessively high viscosity.

The block polymer of the present invention can change a state (characteristics) thereof in response to various stimuli. Such state change can be, for example, a phase change from a sol state to a gel state, a phase change from a liquid state to a solid state, or a change in the chemical structure. The stimulus responsiveness in the present invention is preferably a heat responsiveness or a solvent responsiveness.

More specifically, such stimulus can be, for example, a change in temperature, an application of an electric field, an exposure to a light (electromagnetic wave) such as ultraviolet light, visible light or infrared light, a change in pH of a decolorable ink (hereinafter represented as composition), an addition of a chemical substance or a change in the concentration of the composition. The stimulus responsiveness in the present specification means that the composition of the present invention changes a property thereof in response to such stimulus. More specifically, the stimulus responsiveness means that the composition shows a significant change in a shape or a physical property thereof in response to a stimulus (environmental change) such as an exposure to an electromagnetic wave, an application of an electric field, a change in temperature, a change in pH, an addition of a chemical substance, or a change in the concentration of the composition. Such property change can be selected in various manners according to the purpose of use of the composition of the present invention.

A first example of the stimulus responsiveness is a responsiveness to a change in temperature, and the temperature change preferably ranges from below to above a phase transition temperature of the composition. Also a stimulus responsiveness of the composition of the present invention is a responsiveness to an exposure to an electromagnetic wave, and such electromagnetic wave preferably has a wavelength range from 100 to 800 nm. Also a stimulus responsiveness in the ink of the present invention is a responsiveness to a change in the pH of the composition, and such pH change preferably ranges from pH 3 to 12. Also the stimulus responsiveness of the present invention includes a responsiveness to a change in the concentration of the ink. Such stimulus can be caused for example in case the concentration of the composition is changed by an evaporation or an absorption of the solvent of the composition, or by a change in the concentration of the polymer dissolved in the composition. Such change in the concentration preferably ranges from below to above a concentration that causes a phase change in the ink. There can also be employed a stimulus responsiveness in which a chemical substance is added to induce a reaction or a physical change thereby causing a viscosity increase or a coagulation. In the present invention, there may also be employed a combination of two or more such stimuli.

The decolorable colorant employed in the present invention can be used in a dissolved state, a fused state or a solid state, but it is preferably in a state of fine solid particles in consideration of the dispersibility in the solvent. Also for the decolorable colorant, various materials can be employed, but there is preferably employed a leuco dye which provides a high productivity and is easily available. Such leuco dye has various mechanisms of decoloration and coloration, such as those by heat, those by an acid and an alkali, or those by a decoloring agent and a color developer, but decoloration and coloration by heat or a solvent are preferably employed because of the simplicity. It is preferred that the stimulus responsiveness of the block polymer matches the stimulus to the leuco dye. A preferred configuration is that the block polymer eliminates an inclusion of the leuco dye in response to a stimulus and a decoloring agent is present in the vicinity.

Also there may be employed a configuration in which a decoloring agent is included in the decolorable ink, and, in such case, the block polymer may include the decoloring agent instead of the colorant.

Specific examples of the leuco dye is shown in the following.

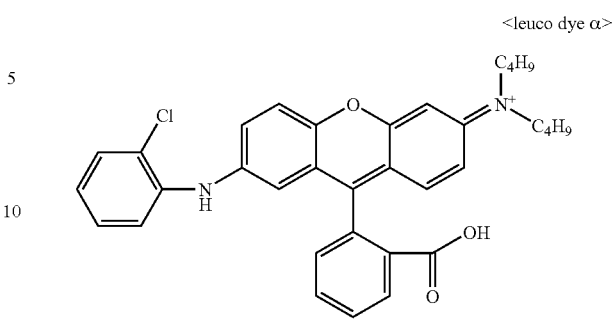

<leuco dye α>

A discoloring agent is capable of decoloring the decolorable colorant, and can be for example an alkaline substance. This leuco dye is known to decolor by an alkali treatment with an alkaline substance.

<leuco dye β>

In the following there will be explained the solvent to be employed in the present invention.

In the present invention, there is included, as a solvent, an organic solvent such as an aliphatic linear, branched or cyclic hydrocarbon, an aromatic hydrocarbon, a heterocyclic hydrocarbon and halogen-containing solvent, an aqueous solvent or water. In particular, in the composition of the present invention, water and an aqueous solvent may be employed individually or in combination. Examples of the aqueous solution include polyhydric alcohols such as ethylene glycol, diethylene glycol, triethylene glycol, polyethylene glycol, propylene glycol, polypropylene glycol or glycerin; polyhydric alcohol ethers such as ethylene glycol monomethyl ether, ethyelen glycol monoethyl ether, ethylene glycol monobutyl ether, diethylene glycol monoethyl ether or diethylene glycol monobutyl ether; and nitrogen-containing solvents such as N-methyl-2-pyrrolidone, a substituted pyrrolidone or triethanol amine. Also in order to accelerate drying on paper in an application of the ink, there may be employed a monohydric alcohol such as methanol, ethanol or isopropyl alcohol.

In the following there will be explained contents of the stimulus-responsive block polymer, the decolorable colorant and the solvent contained in the decolorable ink of the present invention.

The block polymer can be employed in a content of 0.1 to 90 wt. %, preferably 1 to 70 wt. % and more preferably 1 to 30 wt. %. A content less than 0.1 wt. % may not be able to exhibit an effect sufficiently, while a content exceeding 90 wt. % may hinder effects of other components.

The decolorable colorant can be employed in a content of 0.1 to 90 wt. %, preferably 1 to 50 wt. % and more preferably 2 to 30 wt. %. A content less than 0.1 wt. % may not be able to exhibit an effect sufficiently, while a content exceeding 90 wt. % may hinder effects of other components.

The solvent can be employed in a content of 5 to 99 wt. %, preferably 10 to 90 wt. % and more preferably 30 to 90 wt. %. A content less than 5 wt. % may not be able to exhibit an effect sufficiently, while a content exceeding 99 wt. % may hinder effects of other components. Also in the decolorable ink of the present invention, there may be included other suitable additives than those explained in the foregoing.

Since the decolorable ink of the present invention includes a stimulus-responsive block polymer, the decolorable colorant can extremely stably maintain the color and can achieve smooth decoloration in response to a stimulus.

The decolorable ink of the present invention, which is preferably prepared with an aqueous solvent, can be preferably employed as an ink jet recording ink.

A second aspect of the present invention provides an image forming method comprising applying an ink onto a recording medium to conduct recording, wherein the ink is a decolorable ink comprising a block polymer having a stimulus responsiveness, a colorant which decolors in response to a change in a property of the block polymer when a stimulus is applied thereto, and a solvent. The application of the ink on the recording medium is preferably achieved by ejecting the ink from an ink ejecting unit, and there is thus provided an ink jet image forming method employing the decolorable ink of the present invention. The ink jet image forming method is represented by a thermal method and a piezo method, but there is preferably employed an image forming method of ejecting the ink by applying thermal energy thereto.

A third aspect of the present invention provides an image forming apparatus for conducting recording by applying an ink onto a recording medium, wherein the ink is a decolorable ink comprising a block polymer having a stimulus responsiveness, a colorant which decolors in response to a change in a property of the block polymer when a stimulus is applied thereto, and a solvent. The application of the ink on the recording medium is preferably achieved by ejecting the ink from an ink ejecting unit. Ink jet printers for employing the decolorable ink of the present invention include various ink jet recording apparatus such as a piezo ink jet printer employing a piezoelectric element, or a thermal ink jet printer in which a bubble is generated by the application of thermal energy to conduce recording.

Such ink jet recording apparatus will be briefly explained in the following with reference to FIGURE.

However, FIGURE merely shows an example of the configuration, and does not restrict the present invention.

FIGURE is a block diagram showing a configuration of an ink jet recording apparatus.

FIGURE shows a configuration in which a head is moved to conduct recording on a recording medium. Referring to FIGURE, a CPU 50 which controls the entire apparatus is connected to an X-direction drive motor 56 and a Y-direction drive motor 58 for driving a head 70 in X and Y directions, respectively through an X-motor drive circuit 52 and a Y-motor drive circuit 54. Under an instruction of the CPU, the X-direction drive motor 56 and the Y-direction drive motor 58 are driven through the X-motor drive circuit 52 and the Y-motor drive circuit 54 respectively, whereby a position of the head 70 with respect to the recording medium is determined.

As shown in FIGURE, a head drive circuit 60 is also connected, in addition to the X-direction drive motor 56 and the Y-direction drive motor 58, to the head 70, which is controlled by the head drive circuit 60 to drive the head 70 thereby ejecting ink for ink jet recording. The CPU 50 is further connected to an X-encoder 62 and a Y-encoder 64 for detecting the position of the head, and receives a positional information of the head 70. A control program is also inputted in a program memory 66. Based on the control program and the positional the positional information from the X-encoder 62 and the Y-encoder 64, the CPU 50 moves the head 70 and causes the ejection of the ink for ink jet recording, while the head is placed in a desired position on the recording medium. In this manner a desired image can be drawn on the -recording medium. Also in case of an image recording apparatus capable of loading plural inks for ink jet recording, the above-explained operations are executed for a predetermined number of times respectively for such inks for ink jet recording, thereby drawing a desired image on the recording medium.

Also after ejecting the ink for ink jet recording, the head 70 may be moved if necessary to a position of a removing means (not shown) for removing an excess ink sticking to the head and may be cleaned off for example by wiping. For such cleaning, there can be employed an already known method.

After the image drawing, the recording medium on which drawing has been conducted is replaced by a new recording medium, by a conveying mechanism (not shown) for the recording medium.

Also in the present invention, the above-described embodiment can be modified or corrected within the scope of the invention. For example, the head 70 is moved in the X and Y directions in the foregoing embodiment, but it is also possible to move the head 70 only in the X-direction (or Y-direction) and to move the recording medium in the Y-direction (or X-direction) in mutual coordination to achieve image drawing.

In the present invention, an excellent effect is attained by a head which is provided with means for generating thermal energy (for example an electrothermal converting member or a laser light) as an energy to be utilized for ejecting the ink for ink jet recording, and which ejects the ink by such thermal energy. Such configuration allows to attain image drawing of high definition. Even better image drawing can be attained by employing the ink for ink jet recording of the present invention.

As to the representative configuration and principle of the apparatus equipped with the means of generating thermal energy, there is preferred for example the one practiced by the use of the basic principle disclosed in the U.S. Pat. Nos. 4,723,129 and 4,740,796. This system is applicable to either of the so-called on-demand type and the continuous type. Particularly the case of the on-demand type is effective because, by applying at least one driving signal which gives a rapid temperature elevation exceeding nucleate boiling and corresponds to the recording information on an electrothermal converting member arranged corresponding to the liquid channel which holds liquid, thermal energy is generated at the electrothermal converting member to induce film boiling at the heat action surface of the head, and a bubble can be consequently formed in the liquid corresponding one-to-one to the driving signals. By ejecting the liquid through a discharge opening by the growth and shrinkage of the bubble, at least one droplet is formed. By forming the driving signals into pulse shapes, growth and shrinkage of the bubble can be effected instantly and adequately to accomplish more preferable ejection of the liquid particularly excellent in the response characteristics. As for the driving signals of such pulse shapes, those disclosed in the U.S. Pat. Nos. 4,463,359 and 4,345,262 are suitable. Further excellent recording can be performed by employment of the conditions described in the U.S. Pat. No. 4,313,124 which discloses an invention concerning the temperature elevation rate of the above-mentioned heat action surface.

As for the configuration of the head, in addition to the combinations of the discharging orifice, liquid channel and electrothermal converting member (linear liquid channel or right-angled liquid channel) as disclosed in the above-mentioned respective specifications, the configuration as taught in the U.S. Pat. Nos. 4,558,333 and 4,459,600 which disclose such a configuration that the heat action portion is arranged in the flexed region is also included in the present invention. In addition, the present invention can also be effectively applied to the configuration of the Japanese Patent Application Laid-Open No. 59-123670 in which a slit common to a plurality of electrothermal converting members is used as the ejecting portion of the electrothermal converting members as well as that of the Japanese Patent Application Laid-Open No. 59-138461 in which an opening for absorbing a pressure wave of thermal energy corresponds to the ejecting portion. This is because the present invention can achieve secure and efficient ejection of the ink, regardless of the configuration of the head.

Furthermore, the present invention is effectively applicable to the head of the full line type having a length corresponding to the maximum width of the printing medium, and such head may have a configuration which satisfies such length by the combination of plural heads, or a configuration constituted by an integrally formed single head.

In addition, the present invention is effective, not only in the serial type, but also in a head fixed to the main body of the apparatus, or an exchangeable chip-type head enabling electrical connection with the main body of the apparatus or ink supply from such main body by being mounted on the main body.

Also the apparatus of the present invention may further include liquid droplet eliminating means. The presence of such means allows to achieve a further excellent ejecting effect.

Also in the configuration of the apparatus of the present invention, the addition of preliminary auxiliary means etc. is preferable, because the effect of the present invention can be further stabilized. Specific examples thereof may include capping means, cleaning means, pressurization or aspiration means, preliminary heating means for effecting heating by an electrothermal converting member, another heating element or a combination thereof, and preliminary ejection means for effecting another ejection independent from the ink ejection.

Most effective for the present invention is a configuration utilizing the aforementioned film boiling.

In the apparatus of the present invention, an ink amount to be ejected from each ejection opening of the head is preferably within a range from 0.1 to 100 picoliters.

In the following there will be explained a recording medium on which image information is recorded by the aforementioned ink. The recording medium can be of resin, metal, paper or any other medium, but a paper medium is preferred as explained in the foregoing. By giving a stimulus to which the block polymer responds and a stimulus by which the leuco dye is decolored, the paper medium is decolored and becomes re-usable. Preferably the both stimuli are coordinated so that the decoloration can be achieved by giving a single stimulus.

The present invention also includes an image forming method which decolors a recording medium, as explained in the foregoing, by a stimulus, and an image forming apparatus capable of executing such image forming method. For example, in case of an apparatus for executing decoloration by heat, there is provided a heat roller similar to that equipped in a fixing portion of a copying apparatus.

As explained in the foregoing, the present invention can provide a decolorable ink that can be utilized in various printing processes.

Also the present invention can provide an image forming method utilizing the decolorable ink of the present invention, and an image forming apparatus employed in such method.

Also the present invention can provide an image erasing method capable of easily erasing an image formed with the decolorable ink of the present invention, and an image erasing apparatus employed in such method.

Also the present invention can provide a recording medium which records information formed by the decolorable ink of the present invention.

EXAMPLES

In the following, the present invention will be clarified further by examples thereof, but the present invention is not limited by such examples.

Example 1

Synthesis of Stimulus-responsive Block Polymers

Preparation of Monomer 2-methoxyethyl vinyl ether (hereinafter represented as MOVE) and 2-ethoxyethyl vinyl ether (hereinafter represented as EOVE) were synthesized by refluxing 2-chloroethyl vinyl ether with sodium methoxide and sodium ethoxide respectively, using tetrabutylammonium iodide catalyst (H. J. Schneider, U.S. Pat. No. 3,062,892 (1962)). Also 2-vinyloxyethyl methacrylate (hereinafter represented as VEM) was synthesized by the Williamson's reaction.

Synthesis of AB Diblock Polymers From MOVE and EOVE

Interior of a glass container equipped with a three-way cock was replaced with nitrogen, and was heated at 250° C. under a nitrogen flow to eliminate adsorbed water. After the system was returned to the room temperature, 12 mmol of MOVE, 16 mmol of ethyl acetate, 0.1 mmol of 1-isobutoxyethyl acetate and 11 ml of toluene were added, and, when the temperature in the system reached 0° C., a 25 wt. % solution of ethyl aluminum sesquinochloride in toluene (0.2 mmol of ethyl aluminum sesquinochloride) was added to initiate polymerization, thereby synthesizing a component A of an AB block polymer.

The molecular weight was monitored on time-shared basis by a gel permeation chromatography (GPC). After the polymerization of the component A, 12 mmol of EOVE were added as a component B to execute synthesis. The polymerization reaction was terminated by adding a 0.3 wt. % ammonia/methanol solution into the system. The reaction mixture after the reaction was diluted by addition of dichloromethane, then washed 3 times with 0.6 N hydrochloric acid and 3 times with distilled water, further concentrated and dried in an evaporator and dried under vacuum to obtain the desired MOVE-b-EOVE diblock polymer. The compound was identified by NMR and GPC, both of which provided satisfactory spectra (Mn=2.5×10$^4$, MnA/MnB=A× 10$^4$/B×10$^4$, Mw/Mn=1.3).

This polymer has a property of responding to a stimulus at 80° C. or higher, thereby releasing an included substance.

Powder of leuco dye α, the aforementioned polymer and diethylene glycol were added in ion-exchanged water and were dispersed by an ultrasonic homogenizer. Then the dispersion was processed by a centrifuge (20,000 rpm×20 minutes) and coarse particles were removed to obtain a pigment dispersion.

The above-mentioned pigment dispersion was added with suitable amounts of an aqueous solvent, ion-exchanged water and an additive, and filtered under a pressure by a filter of 1 μm to prepare an ink for ink jet recording (sample A) having the following composition (total amount: 100 parts by weight). During these operations, heating and cooling were suitably executed.

| (Sample A) | |
| --- | --- |
| leuco dye | 2 parts by weight |
| MOVE-b-EOVE | 5 parts by weight |
| (MOVE: EOVE = 1:1, Mw/Mn = 1.3) | |
| diethylene glycol | 10 parts by weight |
| ion-exchanged water | remainder |
| total | 100 parts by weight |

This ink did not show a change in color even after standing for 2 weeks.

The ink was filled in an ink tank of an ink jet printer (BLC-800J, manufactured by Canon Inc.) and was used for image recording to obtain a clear print.

The print was clearly decolored by spraying a 0.1 N aqueous solution of sodium hydroxide and heating at 80° C. or higher with a heating iron.

Example 2

The ink of the example 1 was adjusted, after the preparation, to a pH value of 9. In this operation the color was not changed. This ink was used for ink jet image recording as in the example 1, to obtain a clear print. The print was clearly decolored by heating at 80° C. or higher with a heating iron.

Example 3

Paper, constituting the recording medium for which decoloration has been conducted in the example 1, was subjected to a printing operation with the ink jet printer (BJC-800J), whereby a clear print was obtained.

Example 4

4 parts by weight of the block polymer of the example 1 and 1.5 parts by weight of the leuco dye were dissolved in 30 parts by weight of THF. Then 200 parts by weight of distilled water were gradually added to obtain an ink composition in which the leuco dye included in the block polymer was dispersed. Then the pH value was adjusted to 10 by adding a 0.1 N solution of potassium hydroxide. This was subjected to ink jet image recording in the same manner as in the example 2 to obtain a clear print. The print was clearly decolored by heating at 80° C. or higher with a heating iron. It was known that the employed block polymer caused a phase change of the block segment of EOVE at 20° C. or lower whereby the polymer micelle was destructed, and the leuco dye was insolubilized and precipitated when the ink prior to the addition of alkali was cooled to 0° C. Based on these facts, it was confirmed that the leuco dye was included in the polymer micelle formed by the block polymer.

What is claimed is:

1. An image erasing method for erasing an image formed by applying an ink containing a solvent, a leuco dye and a block polymer on a recording medium by an ink jet method, comprising the steps of:

applying the ink on the recording medium wherein the leuco dye is included in a micelle formed by the block polymer;

applying thermal energy to the image formed with the ink, thereby eliminating inclusion of the leuco dye; and allowing an alkaline substance to come into contact with the leuco dye the inclusion of which has been eliminated, thereby erasing the image.

2. The image erasing method according to claim 1, wherein the alkaline substance is contained in the ink.

3. The image erasing method according to claim 1, wherein the block polymer has a repeating unit structure of polyvinyl ether.

4. The image erasing method according to claim 1, wherein the repeating unit structure of polyvinyl ether is represented by the following general formula (1):

wherein R$^1$ represents a linear, branched or cyclic alkyl group with 1 to 18 carbon atoms, Ph, Pyr, Ph-Ph, Ph-Pyr, —(CH(R$^2$)—CH (R$^3$)—O)$_1$—R$^4$ or —(CH$_2$)$_m$—(O)$_n$—R$^4$, in which a hydrogen atom in an aromatic ring may be substituted by a linear or branched alkyl group with 1 to 4 carbon atoms while a carbon atom in an aromatic ring may be substituted by a nitrogen atom; l is an integer from 1 to 18; m is an integer from 1 to 36; n represents 0 or 1; R$^2$ and R$^3$ each independently represents a hydrogen atom or CH$_3$; and R$^4$ represents a hydrogen atom, a linear, branched or cyclic alkyl group with 1 to 18 carbon atoms, Ph, Pyr, Ph-Ph, Ph-Pyr, —CHO, —CO—CH=CH$_2$, or —CO—C(CH$_3$)=CH$_2$, in which, in case R$^4$ is other than a hydrogen atom, a hydrogen atom in an aromatic ring may be substituted by a linear or branched alkyl group with 1 to 4 carbon atoms, F, Cl or Br while a carbon atom in an aromatic ring may be substituted by a nitrogen atom.

* * * * *